Oct. 8, 1963  J. E. BERNARD, JR  3,106,366
REEL ASSEMBLY
Filed June 3, 1959  3 Sheets-Sheet 1

Inventor:
John E. Bernard, Jr.
By Wilmer Mechlin
his Attorney

Oct. 8, 1963　　　J. E. BERNARD, JR　　　3,106,366
REEL ASSEMBLY
Filed June 3, 1959　　　　　　　　　　　　3 Sheets-Sheet 2
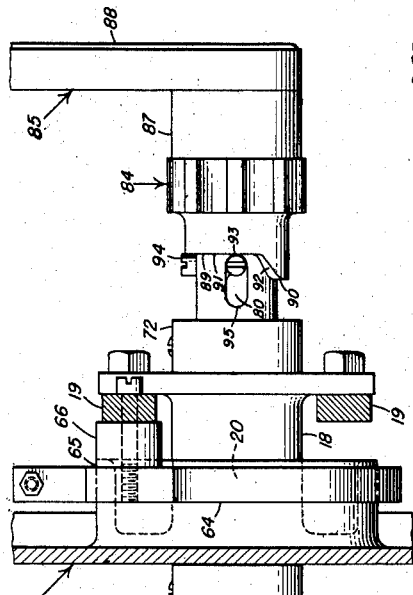
FIG. 8
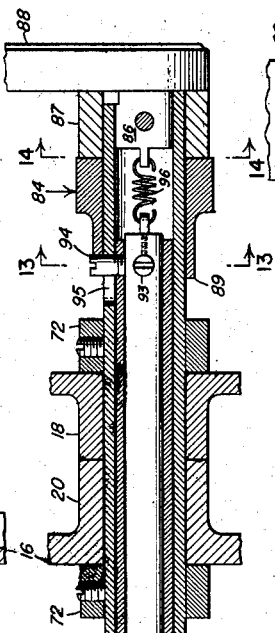
FIG. 9
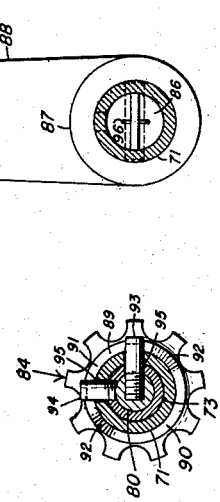
FIG. 14
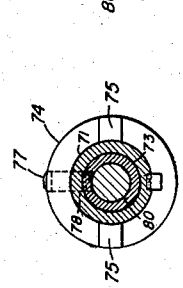
FIG. 13
FIG. 12
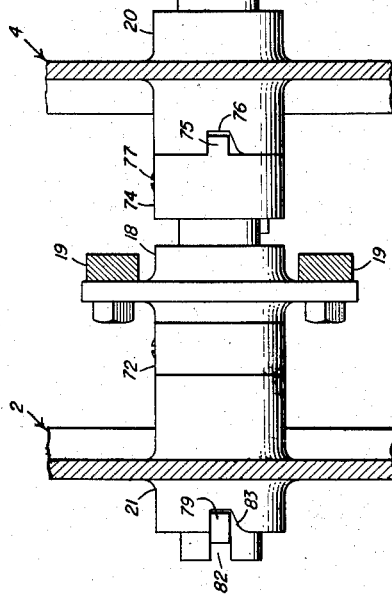
FIG. 11
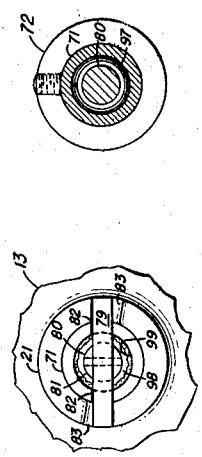
FIG. 10
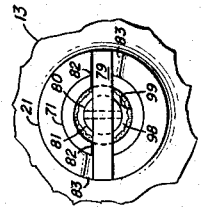
Inventor:
John E. Bernard, Jr.
By Wilmer Mechlin
his Attorney

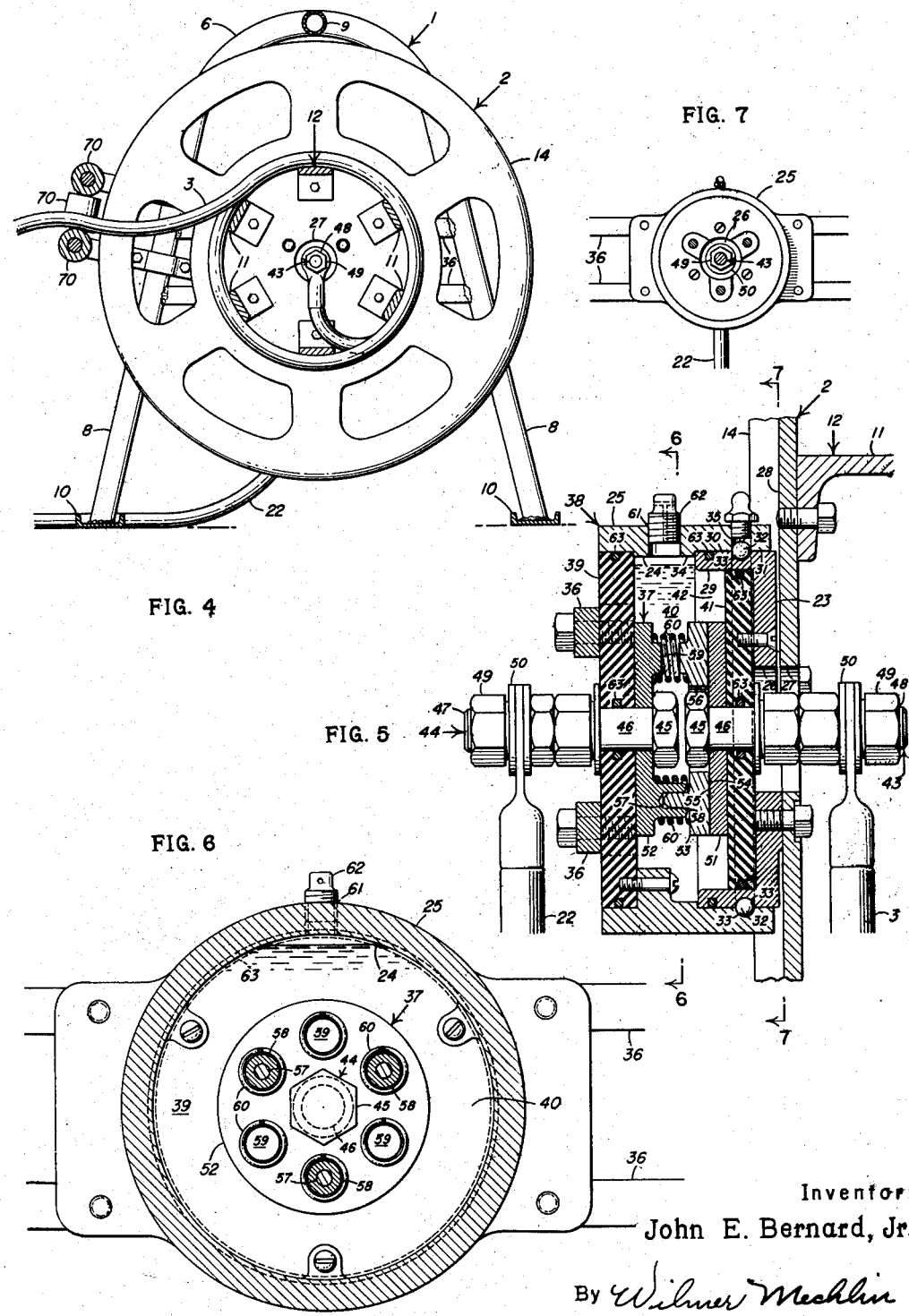

United States Patent Office 3,106,366
Patented Oct. 8, 1963

3,106,366
REEL ASSEMBLY
John E. Bernard, Jr., Salem, Va., assignor to Graham-White Manufacturing Company, Salem, Va., a corporation of Virginia
Filed June 3, 1959, Ser. No. 817,786
8 Claims. (Cl. 242—77)

This invention relates to reel assemblies and has for an object the provision of an improved reel assembly for making contact with and selectively reeling one or more conductors.

Another object of the invention is to provide an improved reel assembly for selectively reeling and making an explosion-proof contact with a "hot" electrical lead.

An additional object of the invention is to provide an improved reel assembly for selectively driving a plurality of reels, either together or independently.

A further object of the invention is to provide a reel assembly whereby a reel may be clutched and declutched for selective drive by means incorporated in a drive shaft on which the reel is wholly or partly mounted.

Another object of the invention is to provide in a reel assembly a compound drive shaft in which each of a plurality of clutches, while keyed for rotation to the drive shaft, is made shiftable relative thereto by a shaft component to which the clutch is fixed.

An additional object of the invention is to provide in a reel assembly a compound drive shaft formed of a plurality of interfitting components selectively shiftable relative to each other for selective drive of one or more reels mounted wholly or partly on the shaft and each drivable through a clutch fixed to one of the components.

A further object of the invention is to provide an improved current collector for electrically connecting relatively rotating terminals which is explosion-proof and will continue to function effectively despite a failure in its main contact means.

Other objects and advantages of the invention will appear hereafter in the detailed description, be particularly pointed out in the appended claims and be illustrated in the accompanying drawings, in which:

FIGURE 4 is a vertical sectional view taken along the lines 4—4 of FIGURE 1;

FIGURE 5 is a fragmentary vertical sectional view on an enlarged scale taken along the line 5—5 of FIGURE 3;

FIGURE 6 is a vertical sectional view taken along the lines 6—6 of FIGURE 5;

FIGURE 7 is a vertical sectional view on a reduced scale taken along the lines 7—7 of FIGURE 5;

FIGURE 8 is a fragmentary vertical sectional view on an enlarged scale taken along the lines 8—8 of FIGURE 2;

FIGURE 9 is a fragmentary vertical sectional view taken along the lines 9—9 of FIGURE 2; and FIGURES 10 through 14 are vertical sectional views taken along the corresponding lines of FIGURE 9.

Figure 1:
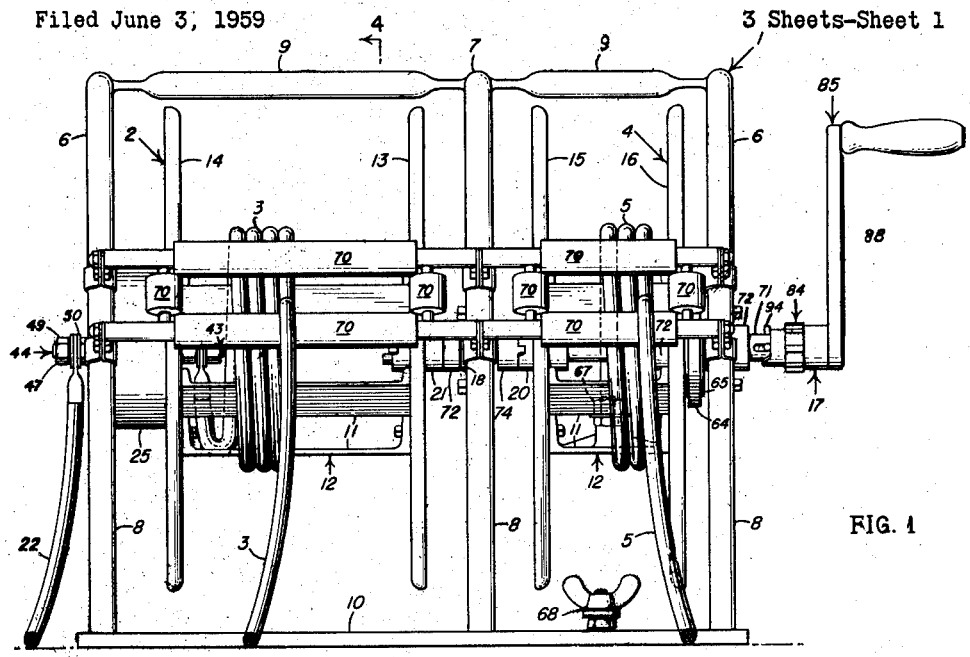
FIGURE 1 is a front elevational view of a preferred embodiment of the reel assembly of the present invention.
Figures 2, 3:
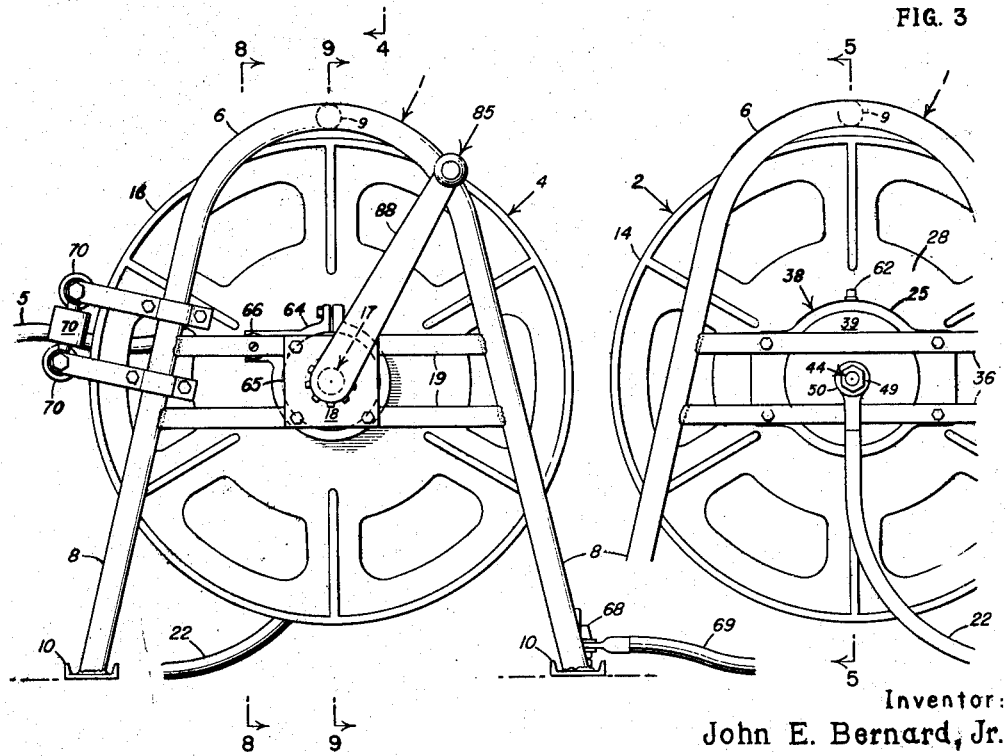
FIGURE 2 is an end elevational view of the drawing and of the assembly.
FIGURE 3 is a fragmentary end elevational view of the opposite end of the assembly.

Referring now in detail to the drawings, in which like reference characters designate like parts, the improved reel assembly of the present invention may be used generally for selectively reeling cable, hose or like reelable objects, wherever a selectively drivable reel is of advantage. However, the reel assembly is particularly adapted and, in the form illustrated as exemplary of the invention, is designed for use in reeling a plurality of insulated electrical cables, such as the leads between a welding machine and a welding head, and to transfer current to either cable during reeling in such manner as to prevent arcing and so suit the assembly for installations where proof against arc-induced explosions is essential.

The improved reel assembly is comprised of a frame or stand 1 rotatably mounting one or more reels, the frame being suitably adapted for movement or for fixed installation depending on the requirements of the particular use for which the assembly is designed. For reeling electrical cable, the reel assembly will generally have a plurality of reels, one for each of the leads between an energy source and the device to be operated. Also, if the installation calls for direct current and grounding at the work is feasible, a single reel for the one lead then required will suffice. In either case, it is intended that a lead or cable remain on its reel and make contact through the assembly with a lead from the energy source or ground, as appropriate. Consequently, it is desirable that each reel or at least its core be made of aluminum or like non-magnetizable material, to prevent induction of magnetism in the core by current flowing through any of the coils of the lead wrapped therearound.

The reel assembly of the illustrated embodiment is particularly designed for use in reeling electrical cable transmitting current between a welding machine (not shown) and a welding head (not shown) and serves both to store the cable and to pay it out and take it up as needed for the welding head to reach the work to be welded. Since the current used in welding is direct, with one lead positive or negative, depending on the welding conditions, it is possible for the reel assembly to have but a single reel. However, the reel assembly has been illustrated with two reels, a first 2 for reeling by a positive or negative, hereinafter termed "hot" lead or cable 3, and a second 4 for reeling a ground lead or cable 5, in case it is inconvenient to ground the welding head at the work. The reels 2 and 4 are mounted concentrically or coaxially and in axial or longitudinally spaced relation on the frame 1. For such mounting, the frame 1 conveniently has a pair of end uprights 6 and an intermediate upright 7, in longitudinal alignment with each other and each suitably tubular and bent into a somewhat inverted U-shape, with its legs 8 downwardly divergent. Connected at the top by longitudinal braces 9, the uprights 6 and 7 are connected at the bottom by a pair of transversely spaced channel irons or other suitable feet 10, each fixed to the legs 8 of the uprights at one side of the frame 1, the feet, if not used as a base for fixing the frame to a foundation or mounting it on suitable wheels for general mobility, conveniently serving as skids for limited mobility.

Each of the illustrated reels 2 and 4 is formed of a pair of inner and outer axially or longitudinally spaced end wheels, discs or flanges connected by circumferentially spaced slats 11 together forming its non-magnetizable core 12, the inner and outer wheels of the first reel 2 being designated as 13 and 14, respectively, and of the second reel 4 as 15 and 16, respectively.

Each of the reels 2 and 4 is contained longitudinally between the intermediate upright 7 and one of the end uprights 6 and the second or ground reel 4 is rotatably mounted entirely on a shaft or axle 17. In turn, the shaft 17 extends from one end of the frame 1 through and is journalled or rotatably mounted in a pair of axially or longitudinally spaced bearings or bushings 18, one carried by the end upright 6 at that end and the other by the intermediate upright 7, and each conveniently supported on and bolted or otherwise secured or fixed to transverse or cross braces 19 connecting and fixed to or rigid with the legs 8 of its upright. Extending through axially bored hubs 20 in the end wheels 15 and 16 of the second reel 4 with a fit such that the reel is free to rotate relative to it, the shaft 17 also extends into the adjoining end of the first reel 2 and correspondingly fits an axially bored hub 21 of or on the inner wheel 13 of that reel, so as rotatably to mount that end of that reel.

Were the reel assembly designed simply for selectively driving the pair of reels 2 and 4, the shaft 17 could be extended the length of the frame 1 and rotatably mount both ends of both reels. However, an important feature of this invention is an explosion-proof connection through the outer end wheel 14 of the first reel 2 between the hot lead 3 and a corresponding lead 22 from the welding machine to the frame 1 and such a connection requires a different rotatable mounting of that wheel on the adjoining end upright 6. Accordingly, the illustrated shaft 17 terminates slightly beyond the hub 21 of the inner wheel 13 of the first reel 2 and its function for the outer end wheel 14 is performed by a hollow stub axle or trunnion 23 fixed or secured to or rigid with the outer wheel and projecting or extending therebeyond into and rotatably seated or journalled in a cylindrical bore 24 in a housing or casing 25 carried by the adjoining end upright.

In its preferred form, the hollow stub axle 23 is an outwardly cupped end plate or member having a central aperture 26 aligning with a corresponding central or axial aperture 27 in the outer wheel 14 and secured as by bolting to the latter's outer end face 28. The end plate is given its cup shape by an integral axially outstanding annular or cylindrical, marginal or peripheral flange or skirt 29, concentric with the hub 21 of the inner wheel 13 and having its rim 30 rotatably seated in a shouldered inner end portion 31 of the bore 24 in the housing 25. For facilitating relative rotation of the stub axle 23 and housing 25, there preferably are provided antifriction means in the form of a plurality of balls 32 interposed between and riding in confronting races or grooves 33 formed in the side wall 34 of the bore 24 and the rim 30 of the flange 29, the balls, which readily may be inserted and lubricated through a normally plugged radial port 35 in the housing, also serving to lock the first reel 2 and the housing against relative axial movement. Supporting the outer end of the first reel 2, the housing 25 may be carried or supported on the frame 1 in the same manner as the bushings 18 by bolting or otherwise fixing or securing it to transverse or cross braces 36 extending between and rigidly connecting the legs 8 of its end upright 6.

The housing 25 not only rotatably mounts the outer end wheel 14 of the first reel 2, but also serves to shield, house, enclose or contain the current collector 37 of the aforementioned explosion-proof connection or connecting means, now designated as 38, between the hot lead 3 on the first reel 2 and the corresponding lead 22 from the welding machine. To this end, the cylindrical bore 24, which extends axially through the housing 25 and is concentric or coaxial with the shaft 17, is closed at its outer end by an insulating block or disc 39, the latter conveniently fitting in a shouldered recess in the outer end portion of the bore and being screwed or otherwise suitably secured to the housing. The opposite or inner end of the central chamber or cavity 40 in the housing 25 is closed by an inner insulating block or disc 41 which seats in the outwardly facing socket 42 in the end plate 23 bounded by the latter's peripheral flange 29 and is screwed or otherwise secured to the end plate so as to rotate therewith.

Each of the insulating blocks 39 and 41 carries or mounts and insulates from the frame 1 and first reel 2 one of a pair of outer and inner bolts 43 and 44, respectively, the heads 45 of which are contained in axially spaced relation in the chamber 40 and the stems 46 of which project oppositely therefrom through their respective insulating blocks. The outer and inner bolts 43 and 44 preferably are substantially concentric with the first reel 2 and, in the threaded end portions of their stems 46 projecting beyond their insulating blocks, provide relatively rotatable outer and inner threaded terminal posts 47 and 48 to which, through suitable nuts 49 and washers 50, the contiguous ends or terminals of the hot lead 3 and the outside lead 22 from the welding machine are connected. Projecting or extending through the central apertures 26 and 37 in the end plate 23 and outer wheel 14, the inner terminal post 48 and its associated nuts and washers is insulated therefrom by the air gap provided by the intervening radial spacing.

Transmission of current between the terminal bolts 43 and 44 and therethrough between the hot and outside leads 3 and 22 is the function of the contact elements of the current collector 37. Housed or contained in the chamber 40 in the housing 25, the contact elements include a preferably flat and circular inner contact disc or plate 51 of conducting material encircling the stem 46 and clamped by the head 45 of the inner terminal bolt 43 to the inner insulating block 41, so as to rotate therewith on rotation of the first reel 2. A second or outer, preferably also circular, disc or plate 52 of conducting material, spaced axially from the first and encircling the stem 46 of the outer terminal bolt 44 is clamped by the latter against the outer insulating block 39. Between these two discs, the outer 52 stationary and the inner 51 rotatable, is interposed a third or intermediate, preferably circular disc or plate 53 of conducting material having a flat inner face 54 adapted to slide on and have surface contact with the confronting outer face 55 of the inner contact disc 51 and centrally apertured as at 56 loosely to receive and be rotatable relative to the head 45 of the inner terminal bolt 43.

Electrical contact or connection between the intermediate and outer contact discs 53 and 52 is made mainly by a plurality of circumferentially spaced prongs or studs 57 projecting axially from one of these members, here the intermediate disc, toward the other member and each seating in or interfitting with one of a plurality of correspondingly arranged and projecting socketed protuberances 58 in the other member. Three in number in the illustrated embodiment and equally spaced, these interfitting studs 57 and protruberances 58 serve not only as the main contacts between the outer and intermediate discs 52 and 53, but to center and hold the latter disc against rotation. At the same time, they serve, with intervening, circumferential pairs of confronting bosses 59 on the two members, to locate or position a plurality of coil springs 60, each encircling one of the main contacts or pairs of bosses and acting axially between the outer and intermediate discs to urge the latter into contact with the inner disc 51. Not only are these springs 60 the means by which contact between the intermediate and inner discs 53 and 51 is maintained during their relative rotation, but by making them of phosphor-bronze or like resilient conducting material of sufficient gauge, the springs are enabled to serve as auxiliary contacts between the outer and intermediate discs in case of failure in a main contact due to breakage or wear.

With contact between the outer and inner terminal bolts 44 and 43 established at all times by the several contact discs 51, 52 and 53, any possible arcing in the connecting is prevented by filling the central chamber with transformer oil or like non-conducting fluid so as to immerse the contact discs in that medium, the chamber being filled through a suitable filler hole 61 extending radially through the top of the housing 25 and normally closed by a breather plug or like suitable means 62 to permit expansion and contraction of the oil. To enable the oil to be held without leakage in the reservoir 62, the joints between the various elements about the chamber are sealed by O-rings or like suitable gaskets 63.

While, by contrast with the hot lead 3 on the first reel 2, the ground lead 5 on the second reel 4 is grounded through the latter and the frame 1 and presents no particular arcing problem, it nonetheless is desirable to ensure that the lead will be grounded from the reel directly to the frame, rather than through the shaft 1. For this purpose, there is provided a collecting ring 64, split for adjustability and slidably encircling a central or axial annular flanges 65 on the outer wheel 16 of the second reel 4, the ring having an integral lug 66 of substantial area through which it is bolted or otherwise directly secured to one of the cross braces 19 of the adjoining end upright 6. With the inner terminal of the ground lead 5 connected to a binding post 65 conveniently provided for that purpose on one of the slats 11 of the second reel, current will thus flow from the ground lead through the reel and the frame 1 to the feet 10 and therethrough to the ground. In case the frame itself is not directly grounded due to the nature of its mounting or the particular surface on which it rests, it usually will be desirable to provide a binding post 68 on one of the feet 10 (not shown) for a cable connection, indicated at 69, between the frame and a suitable ground.

With each of the hot and ground cables 3 and 5 running through one of a pair of sets of guide rollers 70 suitably mounted for that purpose on one side of the frame 1, the reels 2 and 4 are made selectively drivable so that the cables may be reeled out or in, either together or independently, in the manner now to be described. Although reel assemblies having a plurality of reels heretofore have been capable of selectively driving their reels, they have required means extraneous to the shaft 17 on which the reels are mounted for clutching and declutching the latter. By contrast, in accordance with this invention, clutching and declutching of the reels for selective drive is entirely a function of the shaft 17 mounting wholly the second reel 4 and partly the first reel 2. The shaft 17, for this purpose, is a compound or multiple component shaft formed of an outside cylindrical sleeve or tubular element or component 71 on which both wheels 15 and 16 of the second reel and the inner wheel 13 of the first wheel are supported and free to rotate, each being fixed against axial shifting relative to the sleeve by suitable set screw-carrying collars 72. Slidable axially in the outer sleeve 71 is an intermediate preferably cylindrical sleeve or tubular element or component 73 to which is fixed, at a point suitable for engagement with one of these wheels, here the inner wheel 15 of the second reel 4, a clutch 74. This clutch conveniently is in the form of a toothed collar keyed or splined for axial shifting but against rotation to the outer sleeve 71 and having a plurality of diametrically opposed or otherwise circumferentially spaced teeth 75 projecting axially toward the hub 20 on the related wheel and seatable in confronting correspondingly spaced notches 75 therein for driving engagement therewith. The connection between the clutch 74 and the intermediate sleeve 73 is made by a radially extending pin or screw 77 extending through the clutch and outer sleeve 71 and threaded into or otherwise fixed to the intermediate sleeve 73, the pin riding in a longitudinally elongated slot 78 in the outer sleeve which is of sufficient longitudinal extent to accommodate the axial shifting of the pin necessary to engage and disengage the clutch and the hub.

Were there only a single reel on the assembly, only the one clutch 74 would be required and the intermediate sleeve 73 could as well be solid as hollow. However, for selective drive of the two reels 2 and 4, a second clutch 79 is necessary, and with it another component of the shaft 17 in the form of an inner rod, cylinder or tube 80 slidable axially relative to both the intermediate and outer sleeves 73 and 71. By terminating the outer sleeve 71 slightly beyond the hub 21 of the inner wheel 13 of the first reel 2 and extending the inner rod 80 substantially to that end of the outer sleeve, the second clutch 79 may be simplified and take the form of a bar seated in and pinned to a bifurcated inner end 81 of the inner rod and projecting radially from either side thereof through laterally aligned, longitudinally elongated slots 82 in and opening onto the inner end of the outer sleeve 71. Projecting radially beyond the outer sleeve 71, the bar clutch 79 is disposed to engage and seat in notches 83 in and at opposite sides of the hub 21 of the inner wheel 13 and so drivably connect or couple that wheel and with it the first reel 2 to the shaft.

Interfitting or nesting and shiftable or slidable axially relative to each other and the outer sleeve 71, the inner rod or cylindrical member 80 and the intermediate sleeve or cylindrical member 73 are adapted to be shifted, and selectively, by a preferably knurled selector ring, wheel or annular knob 84 rotatably collaring or encircling the outer sleeve 71 of the shaft 17 outwardly of the frame 1. Backed against outward shifting or movement on the shaft 17 by stop means suited to the particular manual or mechanical drive by which the shaft is driven or rotated, the selector ring 84, for the illustrated manual drive by a crank 85 having a hub or plug 86 fitting into and pinned to the outer end of the shaft, is backed by a spacer 87 interposed between it and the arm 88 of the crank. The selector ring 84 has as its inner or frame-confronting end 89 a pair of preferentially substantially flat inner and outer abutments or shoulders 90 and 91, respectively, spaced both circumferentially and axially and connected at their ends by a pair of opposed or oppositely directed or inclined cam faces 92, the abutments being substantially normal and the cam faces inclined to the axis of the shaft 17.

Riding or sliding on and yieldably engaging the inner end 89 of the selector ring 84 are a pair of selector or shifting pins or studs, one 93 fixed to the inner rod 80 and the other 94 fixed to the intermediate sleeve 73, and each projecting radially therefrom through a slot or slots 95 formed in the intervening sleeve or sleeves and of sufficient longitudinal elongation to accommodate shifting of the pins between the two abutments. The selector pins 93 and 94 are circumferentially spaced with their spacing such relative to the extent of the abutments 90 and 91 that they can engage at one time either the same or a different abutment. They are yieldably urged into engagement with the selector ring 84 by yieldable or spring means contained in or carried by and acting between the outer sleeve 71 and their respective cylindrical members 73 and 80. These spring means suitably are a pair of springs, both contained in the outer sleeve, one, a rod spring 96, connected or hooked to and acting in tension between the outer end of the inner rod 80 and the confronting end of the hub 86 of the crank 85, and the other, an intermediate sleeve spring 97, encircling the inner end portion of the inner rod 80 and acting in compression between the inner end of the intermediate sleeve 73 and an annular flange or abutment 98 fixed to and instanding from the inner wall 99 of the outer sleeve 71 beyond the intermediate sleeve 73.

The extent of the shifting of the inner and intermediate cylindrical members 80 and 73 by the selector ring 84 corresponding to that required to engage and disengage their respective clutches 79 and 74 from the related wheels of the first and second reels 2 and 4, whether either reel will rotate with or idle on the shaft 17 as the latter is rotated will depend on the setting of the selector ring. Thus, if the ring 84 is set so that both of the selector pins 93 and 94 engage the inner abutment 90, both of the reels will be disengaged from the shaft 17 and idle thereon. Conversely, if the position of the selector ring is such that both of the selector pins are in engagement with the outer abutment 91, both of the reels will be engaged by their clutches and rotate with the shaft. Alternately, if the selector ring is in an intermediate position, with one of the selector pins on the outer and the other on the inner of the abutments, the reel engaged by the clutch connected to the pin on the inner abutment will rotate and the other reel will idle on rotation of the shaft. Thus, by appropriately setting the selector ring 84, either or both of the reels 2 and 4 will be driven by or idle on the shaft 17 as the latter is driven.

From the above detailed description, it will be apparent that there has been provided an improved reel assembly capable of selectively driving one or a plurality of reels and, in electrical installations, of providing an explosion-proof connection between a cable wound on a reel and a source of power. It should be understood that the described and disclosed embodiment is merely exemplary of the invention and that all modifications are intended to be included which do not depart from either the spirit of the invention or the scope of the appended claims.

Having described my invention, I claim:

1. A reel assembly comprising a frame, a reel rotatably mounted on said frame, a compound drive shaft rotatably mounted on said frame and including outer and inner cylindrical members shiftable axially relative to each other, a clutch carried by and rotatable with said outer member and shiftable axially relative thereto with said inner member for engagement and disengagement with said reel, and cam means carried by and rotatable on said outer member and engageable with means fixed to said inner member for relative axial shifting of said members.

2. A reel assembly comprising a frame, a reel rotatably mounted on said frame, a compound drive shaft rotatably mounted on said frame and including outer and inner cylindrical members shiftable axially relative to each other, a clutch carried by and rotatable with said outer member and shiftable axially relative thereto with said inner member for engagement and disengagement with said reel, and selector means rotatable on said outer member and having a plurality of axially spaced cam-connected abutments alternately engageable with means fixed to said inner member for relative axial shifting of said members.

3. A reel assembly comprising a frame, a reel rotatably mounted on said frame, a compound drive shaft rotatably mounted on said frame and including outer and inner cylindrical members shiftable axially relative to each other, a clutch carried by and rotatable with said outer member and shiftable axially relative thereto with said inner member for engagement and disengagement with said reel, selector means rotatable on said outer member and having a plurality of axially spaced cam-connected abutments alternately engageable with means fixed to said inner member for relative axial shifting of said members, and spring means in said outer member and acting between said members for yieldably urging said fixed means into engagement with said selector means.

4. A reel assembly comprising a frame, a reel rotatably mounted on said frame, a compound drive shaft rotatably mounted on said frame and including outer and inner cylindrical members shiftable axially relative to each other, a clutch carried by and rotatable with said outer member and shiftable axially relative thereto with said inner member for engagement and disengagement with said reel, a selector ring rotatable on said outer member and having a plurality of axially spaced cam-connected abutments, means fixed to and projecting radially from said inner member and alternately engageable with said abutments for selective axial shifting of said inner member on rotation of said selector means, means for limiting axial movement of said ring in a direction away from said fixed means, and spring means acting between said members for yieldably urging said fixed means into engagement with said selector means.

5. A reel assembly comprising a frame, a plurality of axially spaced concentric reels rotatably mounted on said frame, a compound drive shaft rotatably mounted on said frame, said drive shaft having an outer cylindrical member rotatably mounting one of said reels and at least one end of said other reel, a plurality of clutches carried by said outer member in axially spaced relation and each engageable with one of said reels, said clutches being rotatable with and shiftable axially relative to said outer member, a plurality of interfitting inner members in and independently shiftable axially of said outer member and each connected for axial movement with one of said clutches, a plurality of pins spaced axially from said clutches and each fixed to and projecting radially from a different one of said inner members through the intervening of said members exteriorly of said outer member, a selector ring rotatably encircling said outer member, said ring having a plurality of axially and circumferentially spaced cam-connected abutments alternately engageable with each of said pins, means for limiting axial movement of said ring in a direction away from said pins, and spring means acting between said outer member and each of said inner members for urging said pins into engagement with said abutments, said ring and spring means cooperating through said pins and inner members for selectively engaging and disengaging said clutches and reels.

6. A reel assembly comprising a frame, a plurality of axially spaced concentric reels rotatably mounted on said frame, a compound drive shaft rotatably mounted on and projecting beyond one end of said frame, said shaft including a multiplicity of interfitting relatively axially shiftable members, a plurality of axially spaced clutches on and rotatable with and shiftable axially relative to an outer of said members and each engageable with one of said reels for drivingly connecting said reels to said shaft, each of said clutches being connected to one of the plurality of inner members for axial shifting therewith relative to said outer member, a plurality of pins each connected to and projecting radially from a different one of said inner members through the intervening of said members outwardly through said outer member beyond said frame, a selector ring rotatably encircling said outer member beyond said pins and restrained against outward movement relative to said shaft, said ring having as its inner pin-confronting end a plurality of circumferentially and axially spaced cam-connected abutments alternately engageable with each pin, a plurality of springs in said outer member and each acting therebetween and one of said inner members for urging the pin fixed thereto against said inner end of said ring, said ring acting against said springs and through said pins and inner members for selectively engaging and disengaging said clutches with the related of said reels.

7. A reel assembly comprising a frame, a plurality of axially spaced rotary members rotatably mounted concentrically on said frame, a hollow drive shaft rotatably mounted on said frame concentrically with said members, a plurality of axially spaced clutches on and each shiftable axially relative to said shaft into and out of engagement with one of said rotary members, a plurality of means in and shiftable axially of said shaft, means connecting each of said last-named means to one of said clutches for axial movement in unison relative to said shaft and rotary movement in unison with said shaft, and a selector ring rotatably mounted on said shaft and connected to said means in said shaft for selectively shifting said means axially of said shaft and thereby selectively engaging said clutches with said rotary members.

8. A reel assembly comprising a frame, a plurality of axially spaced rotary members rotatably mounted concentrically on said frame, a hollow drive shaft rotatably mounted on said frame concentrically with said members, a plurality of axially spaced clutches on and each shiftable axially relative to said shaft into and out of engagement with one of said rotary members, a plurality of means in and shiftable axially of said shaft, means connecting each of said last-named means to one of said clutches for axial movement in unison relative to said shaft and rotary movement in unison with said shaft, a selector ring rotatably mounted on said shaft and connected to said means in said shaft for selectively shifting said means axially of said shaft and thereby selectively engaging said clutches with said rotary members, and a plurality of spring means in said shaft and each acting therebetween and one of said clutch-connected means in said shaft for yieldably resisting axial movement thereof by said ring.

References Cited in the file of this patent

UNITED STATES PATENTS

| | | |
|---|---|---|
| 938,772 | Lambert | Nov. 2, 1909 |
| 954,475 | Sessions | Apr. 12, 1910 |
| 1,123,602 | Sessions | Jan. 5, 1915 |
| 1,160,857 | Coseo | Nov. 16, 1915 |
| 1,386,396 | Cornelison | Aug. 2, 1921 |
| 1,393,286 | Hosford | Oct. 11, 1921 |
| 1,631,392 | Wright | June 7, 1927 |
| 1,867,141 | Farnham | July 12, 1932 |
| 1,976,516 | Renshaw et al. | Oct. 9, 1934 |
| 2,209,598 | Coxe | July 30, 1940 |
| 2,225,185 | Sloane | Dec. 17, 1940 |
| 2,257,023 | Ray | Sept. 23, 1941 |
| 2,285,860 | Jeffrey et al. | June 9, 1942 |
| 2,325,805 | Shoffner | Aug. 3, 1943 |
| 2,452,775 | Lindsley | Nov. 2, 1948 |
| 2,575,409 | Cooper et al. | Nov. 20, 1951 |
| 2,636,066 | Sciaky | Apr. 21, 1953 |